(12) United States Patent
Suese (10) Patent No.: US 9,420,126 B2
(45) Date of Patent: Aug. 16, 2016

(54) IMAGE FORMING APPARATUS AND SCREEN OPERATION METHOD

(71) Applicant: KYOCERA Document Solutions Inc., Osaka (JP)

(72) Inventor: Narihiko Suese, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/859,282

(22) Filed: Sep. 19, 2015

(65) Prior Publication Data

US 2016/0088172 A1 Mar. 24, 2016

(30) Foreign Application Priority Data

Sep. 19, 2014 (JP) .................. 2014-191233

(51) Int. Cl.
*G06F 3/12* (2006.01)
*H04N 1/00* (2006.01)
*G06F 3/0482* (2013.01)
*G06F 3/0484* (2013.01)
*G06F 3/0488* (2013.01)

(52) U.S. Cl.
CPC .......... *H04N 1/00381* (2013.01); *G06F 3/0482* (2013.01); *G06F 3/04842* (2013.01); *G06F 3/04883* (2013.01); *G06F 2203/04808* (2013.01); *H04N 2201/0094* (2013.01)

(58) Field of Classification Search
CPC . G06F 3/0488; G06F 3/04883; G06F 3/0482; G06F 3/04842; H04N 1/00381
See application file for complete search history.

(56) References Cited

U.S. PATENT DOCUMENTS

| 2011/0167350 A1* | 7/2011 | Hoellwarth | G06F 3/0483 715/727 |
| 2012/0131520 A1* | 5/2012 | Tang | G06F 3/04883 715/863 |
| 2014/0115436 A1* | 4/2014 | Beaver | G06F 17/2288 715/229 |

FOREIGN PATENT DOCUMENTS

JP 2012-084035 A 4/2012

\* cited by examiner

*Primary Examiner* — Benjamin O Dulaney
(74) *Attorney, Agent, or Firm* — Hawaii Patent Services; Nathaniel K. Fedde; Kenton N. Fedde (57) ABSTRACT

Provided is an image forming apparatus mainly including a recognition part, a first determination part, and a second determination part. The recognition part recognizes the plural characters when a user performs a first operation tracing a sequence of plural characters out of the character group included in the screen displayed on the display part by bringing an indicator into contact with the touch panel part. The first determination part determines whether or not the plural characters recognized by the recognition part match with any of predetermined plural terms. The second determination part determines whether or not a user performs a second operation that is gesture different from the first operation by bringing the indicator into contact with the touch panel after the first operation is performed.

5 Claims, 12 Drawing Sheets

```
REDUCTION/
ENLARGEMENT ┬─ DOWNWARD FLICK: HELP SCREEN 11 EXPLAINING
            │                  REDUCTION/ENLARGEMENT COPYING
            │                  FUNCTION
            └─ UPWARD FLICK: HELP SCREEN 13 EXPLAINING
                             LAYOUT COPYING FUNCTION
```

IMAGE FORMING APPARATUS AND SCREEN OPERATION METHOD

INCORPORATION BY REFERENCE

This application is based on and claims the benefit of priority from Japanese Patent Application No. 2014-191233 filed on Sep. 19, 2014, the entire contents of which are hereby incorporated by reference.

BACKGROUND

The present disclosure relates to a technology of operating a screen displayed on a display part provided in an image forming apparatus.

Regarding an image forming apparatus operated by using a touch panel-type operation screen, there has been proposed so far a technology of switching a display of the operation screen by gesture with a finger. Examples of the technology includes an image forming apparatus which displays an express mode screen when a user makes a flick operation on a function setting area in a regular mode screen.

SUMMARY

An image forming apparatus comprising a display part; a touch panel part that is arranged on the display part; a display control part that causes the display part to display a screen including a character group associated with an operation of the image forming apparatus; a recognition part that recognizes a sequence of plural characters when a user performs a first operation tracing the plural characters out of the character group included in the screen displayed on the display part by bringing an indicator into contact with the touch panel part; a first determination part that determines whether or not the plural characters recognized by the recognition part match with any of predetermined plural terms; and a second determination part that determines whether or not the user performs a second operation that is a gesture different from the first operation by bringing the indicator into contact with the touch panel after the first operation is performed, wherein the display control part causes the display part to display a predefined screen correlated with terms matched with the plural characters out of the plural terms when the first determination part determines that the plural characters match with any of the plural terms, and when the second determination part determines that the second operation is performed.

A screen operation method, comprising the steps of a first display step that causes a display part on which a touch panel part is arranged to display a screen including a character group associated with an operation of an image forming apparatus; a recognition step that recognizes a sequence of plural characters when a user performs a first operation tracing the plural characters out of the character group included in the screen displayed on the display part by bringing an indicator into contact with the touch panel part; a first determination step that determines whether or not the plural characters recognized in the recognition step match with any of predetermined plural terms; a second determination step that determines whether or not the user performs a second operation that is a gesture different from the first operation by bringing the indicator into contact with the touch panel part after the first operation is performed; and a second display step that causes the display part to display a predefined screen correlated with terms matched with the plural characters out of the plural terms when the first determination step determines that the plural characters match with any of the plural terms, and when the second determination step determines that the second operation is performed.

DETAILED DESCRIPTION

Figure 1:
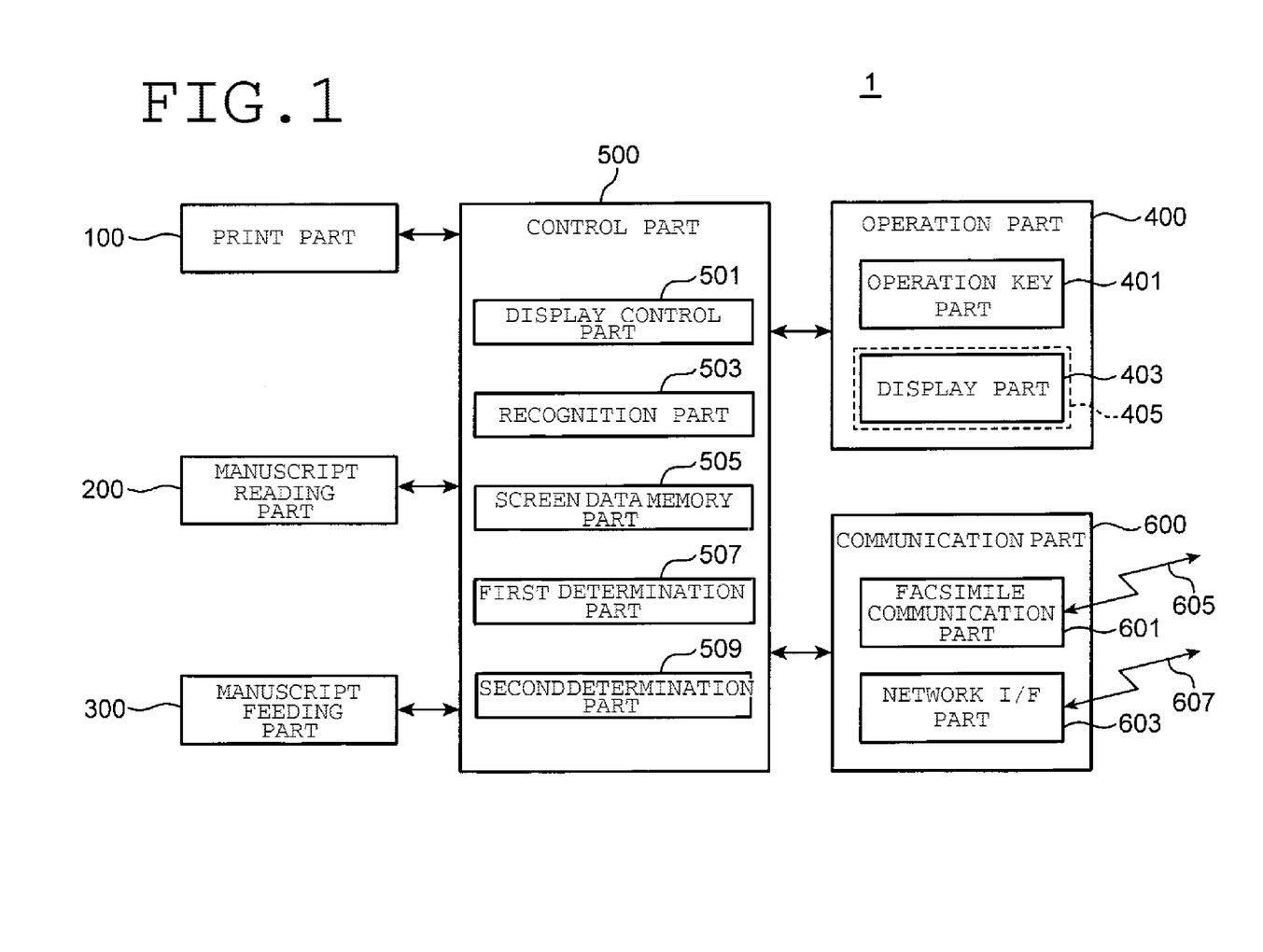
FIG. 1 is a block diagram indicating a configuration of an image forming apparatus according to the present embodiment.

Hereinafter, an exemplary embodiment of the present disclosure will be described in detail with reference to the accompanying drawings. FIG. 1 is a block diagram indicating a configuration of an image forming apparatus 1 according to one embodiment of the present disclosure. As an example of the image forming apparatus 1, a description will be made by giving a digital multi-function machine a an example, having a copy function, a printer function, a scanner function, and a facsimile function. It is to be noted that the image forming apparatus 1 has only to have a print function for printing an image, and therefore is not necessarily limited to the digital multi-function machine. For example, a printer may be taken as the image forming apparatus 1. The image forming apparatus 1 includes a print part 100, a manuscript reading part 200, a manuscript feeding part 300, an operation part 400, a control part 500, and a communication part 600

When a sheet of manuscript is placed on a manuscript mounting part of the manuscript feeding part 300, the manuscript feeding part 300 feeds the manuscript to the manuscript reading part 200. In a case where plural manuscripts are stacked on the manuscript mounting part of the manuscript feeding part 300, the manuscript feeding part 300 sequentially feeds plural manuscripts to the manuscript reading part 200.

The manuscript reading part 200 reads a manuscript placed on a platen or a manuscript fed from the manuscript feeding part 300. Then, the manuscript reading part 200 outputs image data of the manuscript.

The print part 100 executes a print job. The print job is a job to create a printed matter for data indicating an image. Examples of the data indicating an image include image data output from the manuscript reading part 200, print data transmitted from a terminal device such as personal computer, and image data received through a facsimile.

The operation part 400 includes an operation key part 401 and a display part 403. The display part 403 has a touch panel part 405 arranged thereon. The display part 403 displays a screen including a soft key. A user performs various settings or the like required for executing a copy function or the like by operating the soft key while watching the screen.

The operation key part 401 is provided with an operation key made of a hardware key. Examples of the operation key include a start key, a numeric key, a reset key, and a function switching key. The function switching key is for switching an operation mode among a copy, a printer, a scanner and a facsimile.

The control part 500 includes a CPU, a ROM, and a RAM. The CPU executes control of the above-mentioned components of the image forming apparatus 1 required for actuating the image forming apparatus 1. One of the above-mentioned components is, for example, is the print part 100. The ROM stores software required for controlling an operation of the image forming apparatus 1. The RAM is used for temporally storing data created during the execution of the software, and for storing application software.

The control part 500 includes, as a functional block, a display control part 501, a recognition part 503, a screen data memory part 505, a first determination part 507, and a second determination part 509. The details of these blocks will be described later.

The communication part 600 includes a facsimile communication part 601 and a network I/F part 603. The facsimile communication part 601 includes an NCU (Network Control Unit) and a modulation/demodulation circuit. The NCU controls a connection to a destination facsimile via a telephone line 605. The modulation/demodulation circuit modulates and demodulates a signal for facsimile communication. The facsimile communication part 601 is connected to the telephone line 605.

The network I/F part 603 is connected to a LAN 607. The network I/F part 603 is a communication interface circuit for executing communication between terminal devices. The terminal device is a personal computer or the like connected to the LAN 607.

The display control part 501 controls to cause the display part 403 to display a screen. This screen is, for example, a screen including a character group associated with an operation of the image forming apparatus 1.

When a first operation is performed, the recognition part 503 recognizes plural characters. In the first operation, a user contacts a finger with the touch panel part 405. Then, the user traces a sequence of plural characters out of the character group included in the screen displayed on the display part 403. As the first operation, a drag operation will be described as an example. Nonetheless, as long as any gesture operation corresponds to the first operation, it does not matter what name it has. A description will be made by taking a finger as an indicator. However, the indicator is not necessarily limited to the finger. For example, it may be a touch pen.

The screen memory part 505 stores screen data indicating a screen displayed on the display part 403.

The image forming apparatus 1 has many functions. The image forming apparatus 1 executes these functions, solely or in combination. Here, the functions refer to a double-sided/division copying function, a rotation copying function, a reduction/enlargement copying function, and a page aggregation copying function. A combined function refers, for example, to a layout copying function that is a combination of these functions.

Figure 2:
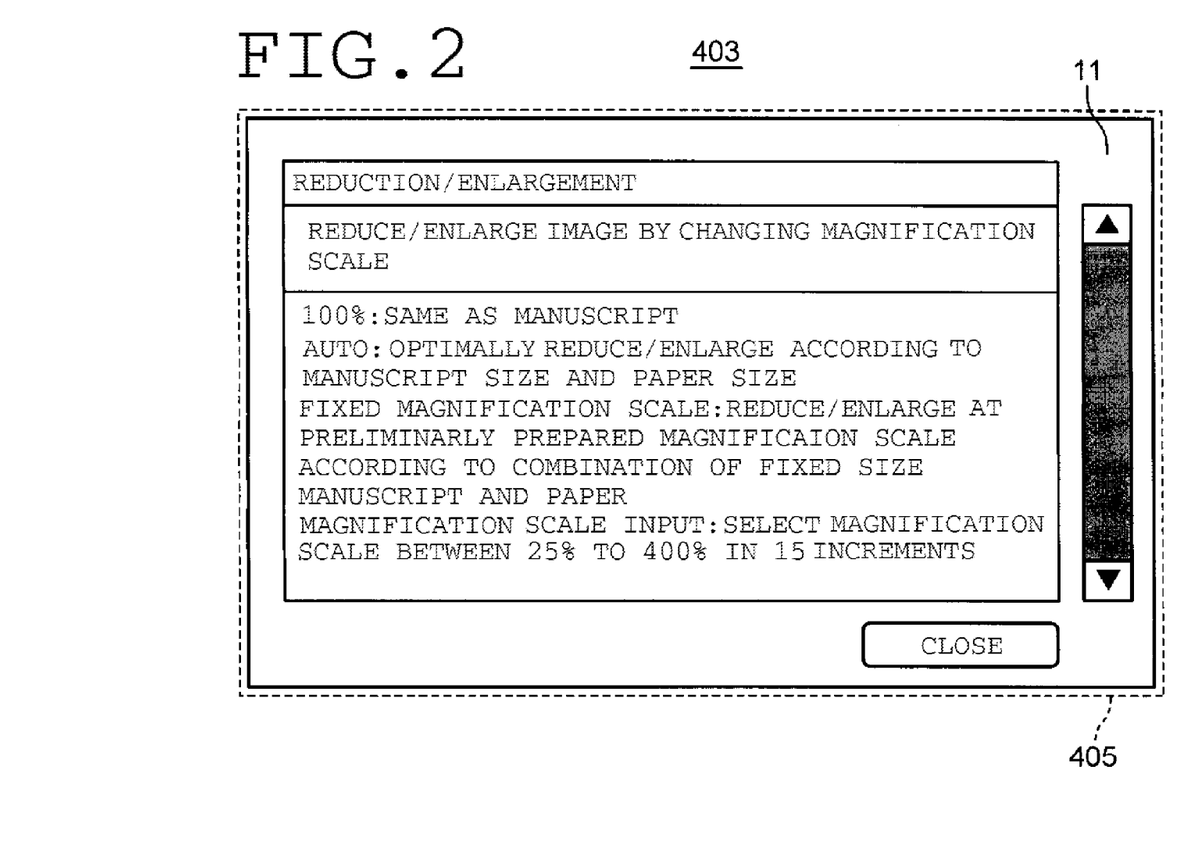
FIG. 2 is a screen indicating a help screen explaining a reduction/enlargement copying function.
Figure 3:
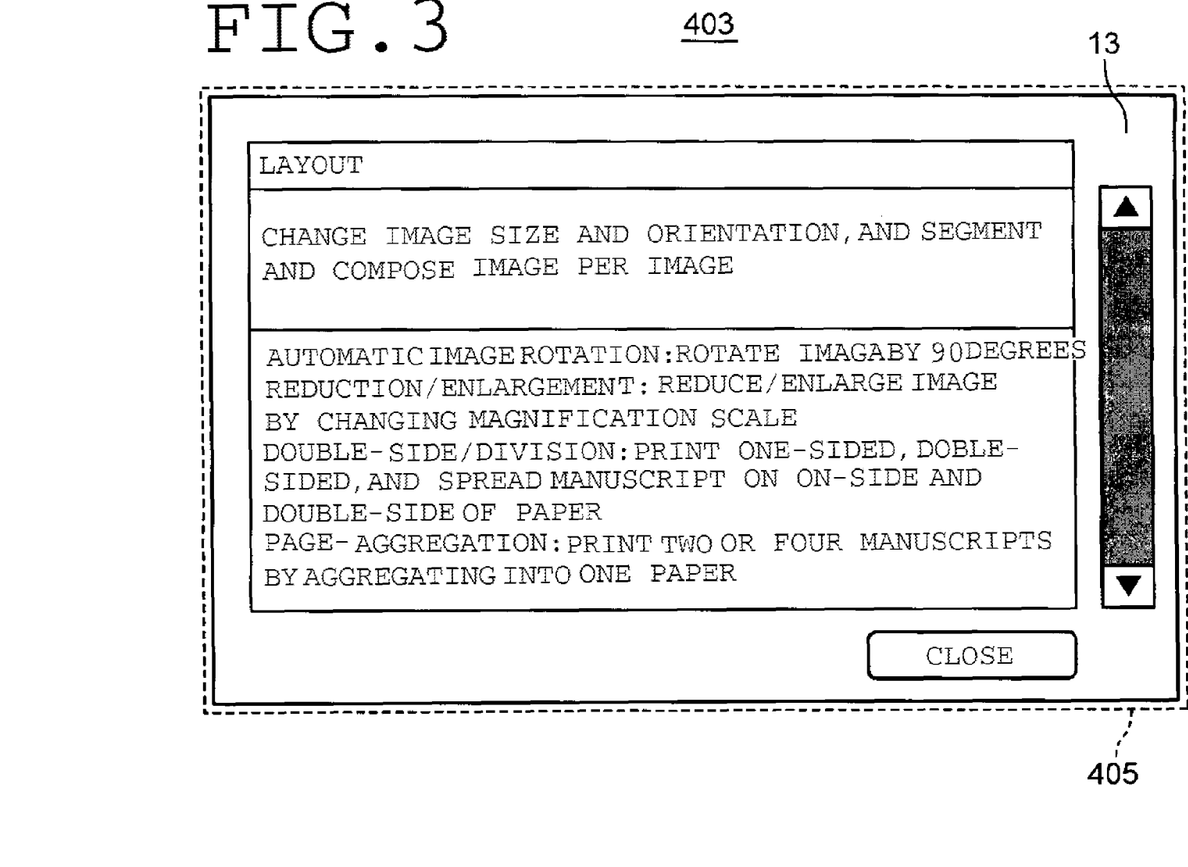
FIG. 3 is a screen indicating a help screen explaining a layout copying function.

For each of the functions, there is previously provided a help screen explaining the functions. Also, for each of the combined functions, there is previously provided a help screen explaining the combined functions. Screen data indicating these help screens is previously stored in the screen data memory part 505. For example, FIG. 2 is a screen indicating a help screen explaining the reduction/enlargement copying function. FIG. 3 is a screen indicating a help screen explaining the layout copying function.

For each function a word indicating its function and for each combined function a word indicating a combined function are defined as a "term". For example, "double-sided/division" that is a word indicating the double-sided/division copying function is a term. The first determination part 507 previously stores a list of these plural terms. The first determination part 507 determines whether or not a sequence of plural characters recognized by the recognition part 503 matches with any of the plural terms.

The second determination part 509 determines whether or not a second operation is performed after a first operation is performed. In the second operation, a gesture different from the first operation is performed by bringing a finger into contact with the touch panel 405. Examples of the second operation include a gesture flicking the touch panel part 405 with a finger. Further, another examples of the second operation include a gesture moving two fingers closer with he two fingers being contacted with the touch panel part 405. A description will be made here by giving an example where the touch panel part 405 is flicked with a finger. Examples of such a gesture include a flick operation. Nonetheless, as long as a gesture operation performed by flicking the touch panel 405 with a finger, it does not matter what name it has.

The second determination part 509 previously stores help screens to be displayed when a downward flick operation is performed correspondingly to the above-mentioned plural terms. Further, the second determination part 509 previously stores a list indicating a help screen to be displayed when an upward flick operation is performed. Here, the downward flick operation is to flick the touch panel part 405 in a downward direction. The downward flick operation is an example of gesture flicking the touch panel part 405 with a finger in a first direction. The upward flick operation is to flick the touch panel 405 in an upward direction. The upward flick operation is an example of flicking the touch panel part 405 with a finger in a second direction opposite to the first direction.

Figure 4:
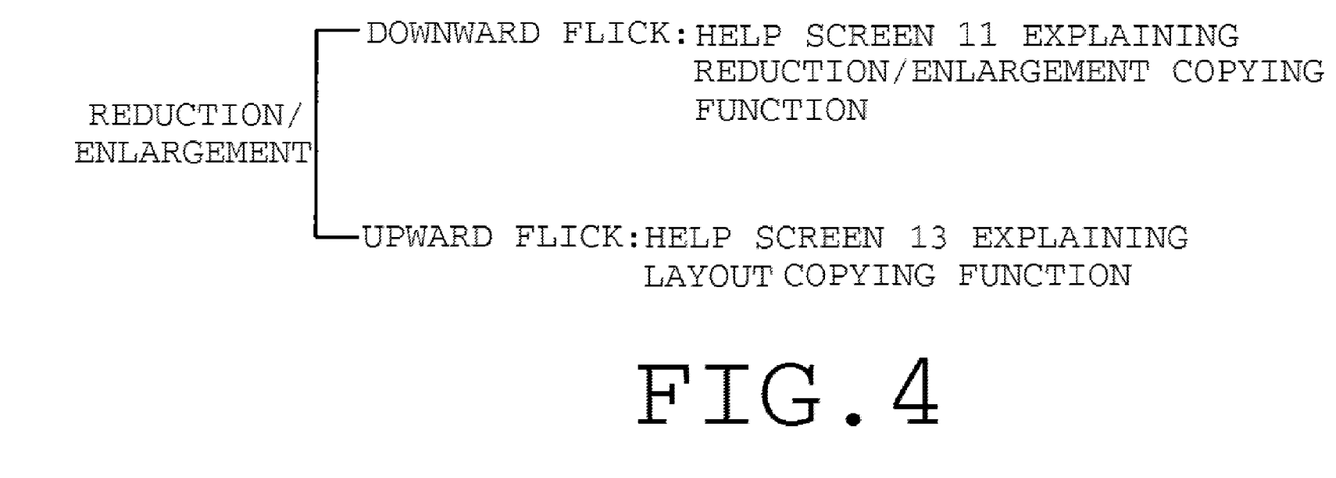
FIG. 4 is an explanatory diagram explaining a list of term "reduction/enlargement"

A specific description will be made to the list. FIG. 4 is an explanatory drawing explaining a list of term "reduction/enlargement". The term "reduction/enlargement" indicates a reduction/enlargement copying function. A help screen to be displayed when a downward flick operation is performed is a help screen 11 explaining a reduction/enlargement copying function shown in FIG. 2. A help screen to be displayed when an upward flick operation is performed is a help screen 13 explaining the layout copying function shown in FIG. 3.

An assumption is made here that the second determination part 509 determines that a user performs a downward flick operation in the second operation. Then, the display control part 501 causes the display part 403 to display the help screen 11 (an example of a first screen) assigned when the downward flick operation is performed. This is a predefined screen.

An assumption is made here that the second determination part 509 determines that a user performs an upward flick operation in the second operation. Then, the display control part 501 causes the display part 403 to display the help screen 13 (an example of a second screen different from the first screen) assigned when the upward flick operation is performed. This is a predefined screen.

Figure 5:
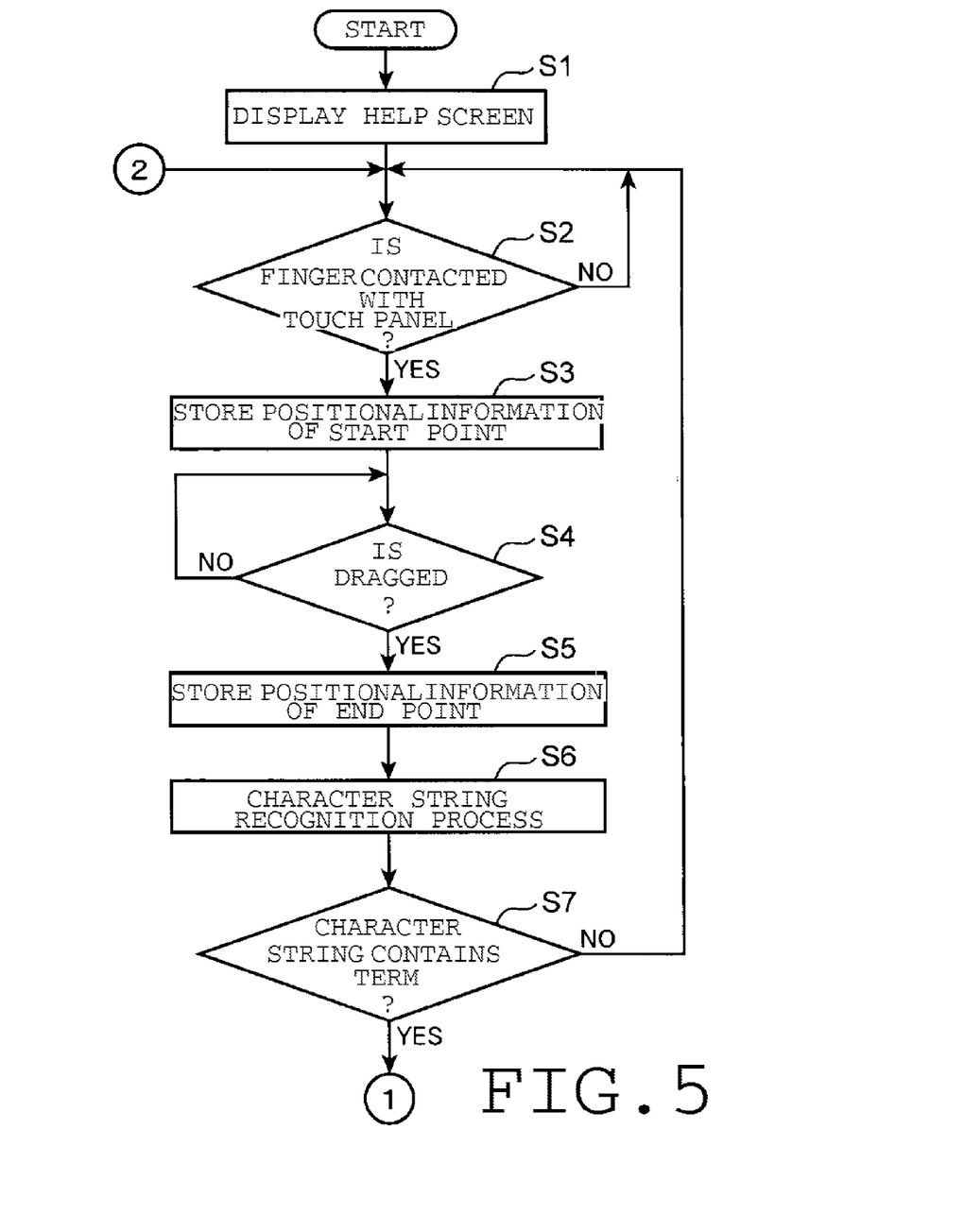
FIG. 5 is a first half of a flowchart explaining an operation of a screen displayed on a display part of the image forming apparatus according to the present embodiment.
Figure 6:
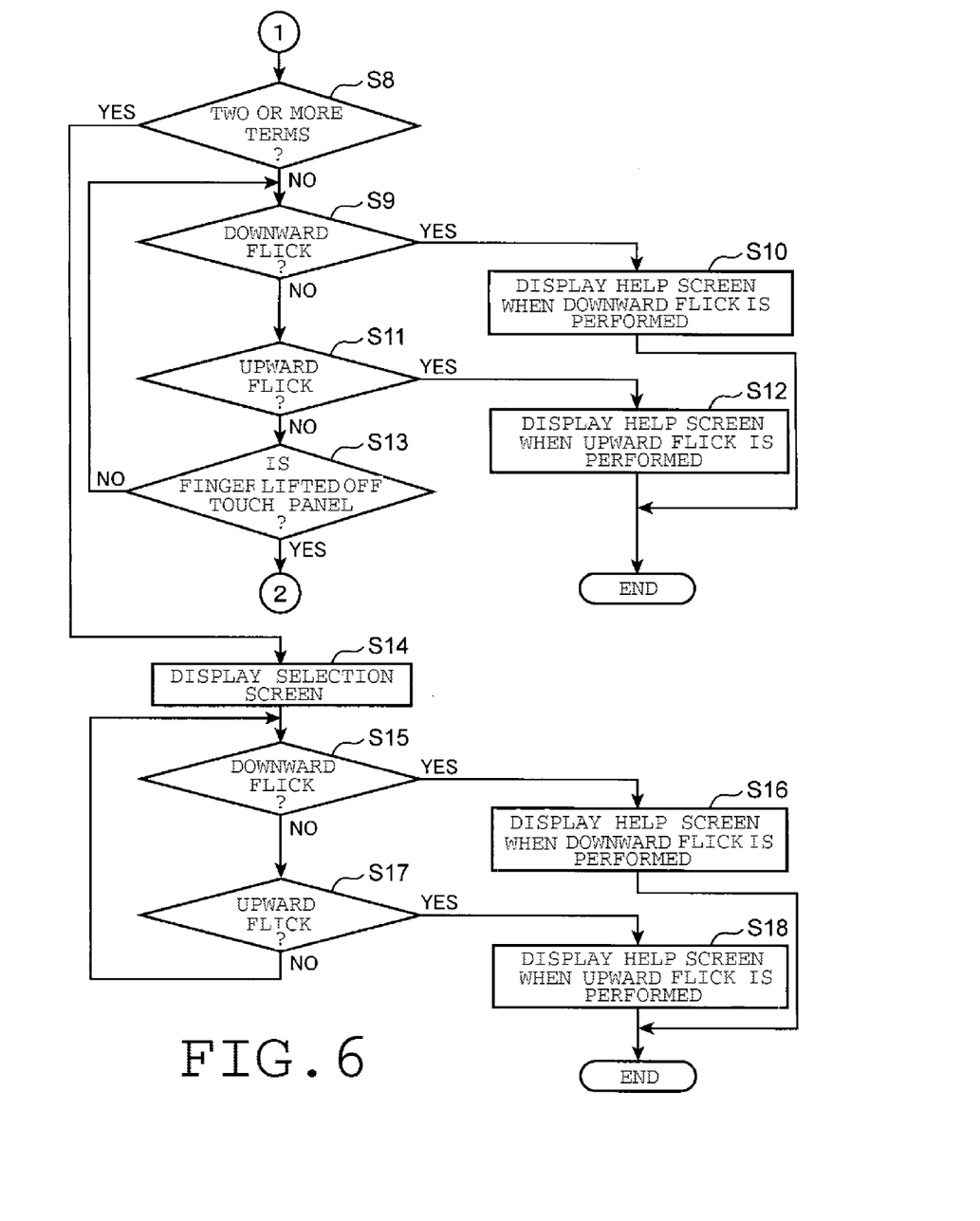
FIG. 6 is a last half of the flowchart explaining an operation of the screen displayed on the display part of the image forming apparatus according to the present embodiment.

A description will be made to an operation of the screen displayed on the display part 403 of the image forming apparatus 1 according to the present embodiment. FIG. 5 and FIG. 6 are flowcharts explaining an operation of the screen. A user operates the operation part 400 shown in FIG. 1 to give a command to display a help screen explaining a certain function. At that time, the display control part 501 reads out the screen data indicating the help screen explaining the certain function from the screen data memory part 505. Subsequently, the display control part 501 causes the display part 403 to display the help screen (step S1). In a case where the certain function is, for example, a double-sided/division copying function, the display control part 501 causes the display part 403 to display a help screen 15 explaining the double-sided/division copying function shown in FIG. 7.

Figure 7:
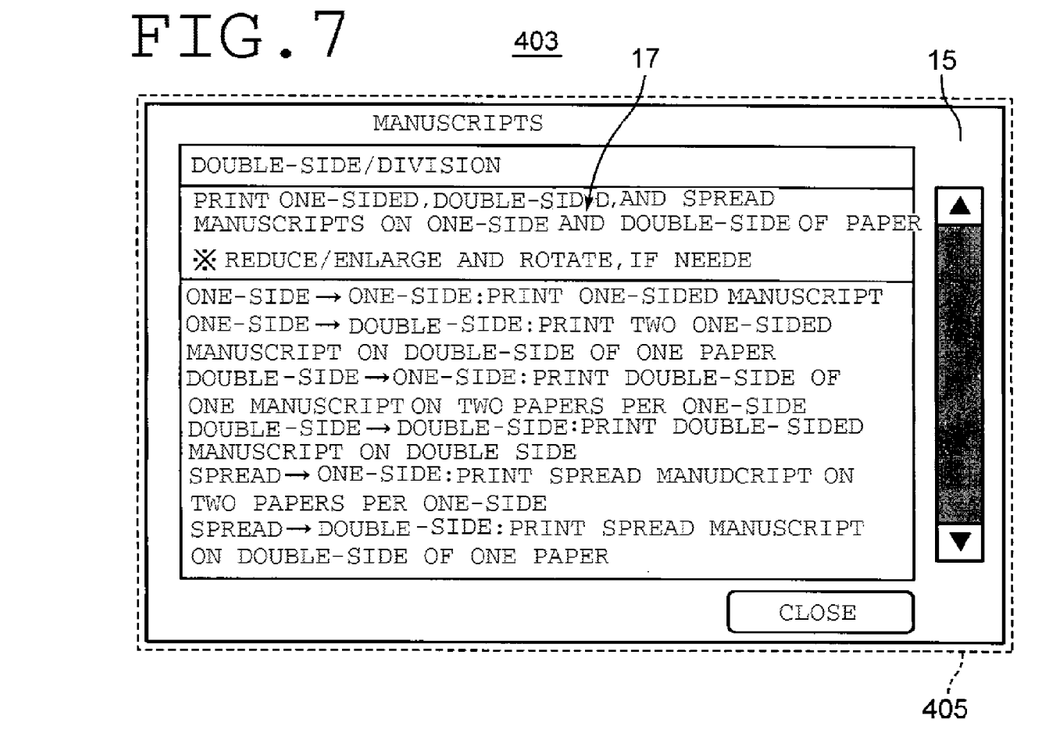
FIG. 7 is a screen indicating a help screen explaining a double-sided/division copying function.

The help screen 15 includes a character group 17 explaining the double-sided/division copying function. An assumption is made here that a user focused his/her attention on a certain term contained in the character group 17. Here, the specific term is, for example, "reduction/enlargement".

Figure 8:
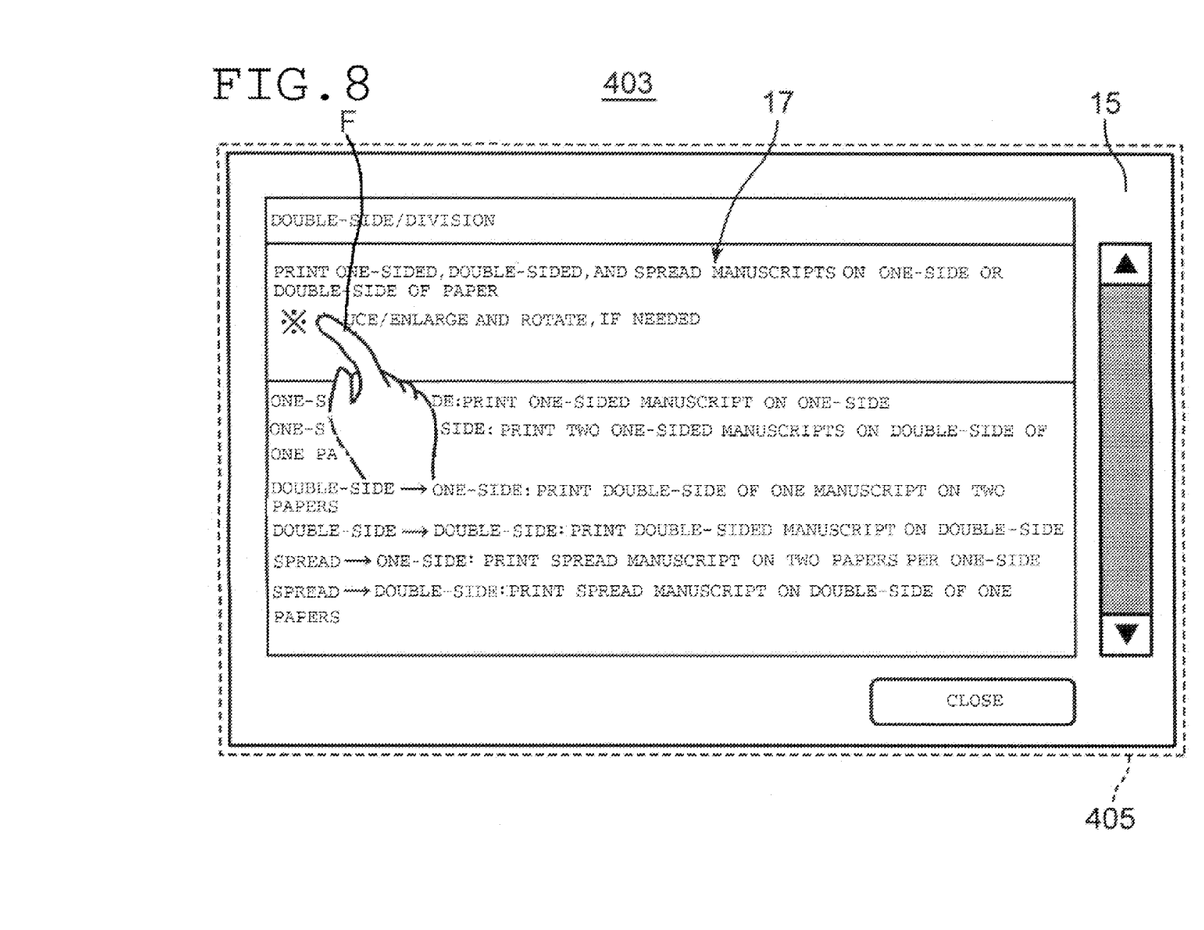
FIG. 8 is a screen indicating a help screen with a finger being contacted with a touch panel.

The recognition part 503 determines whether or not a user brings a finger F (an example of an indicator) into contact with the touch panel part 405 as shown in FIG. 8 (step S2).

If the recognition part 503 determines that the finger F is not contacted with the touch panel part 405 (No in step S2), the process of step 2 will be repeated.

Otherwise, if the recognition part 503 determines that the finger F is contacted with the touch panel part 405 (Yes in step S2), the recognition part 503 stores positional information of a start point on the touch panel part 405 (step S3). The recognition part 503 takes a position at which a user firstly brings the finger F into contact with the touch panel part 405 as a start point.

Figure 9:
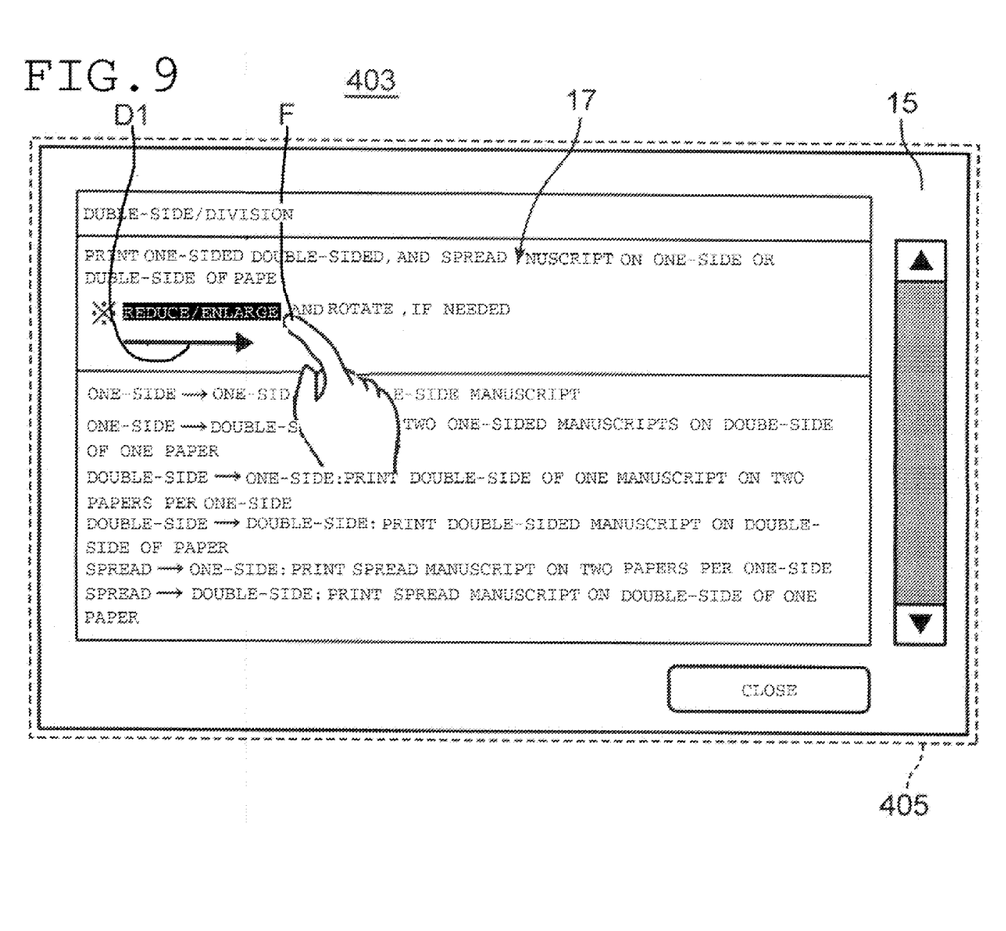
FIG. 9 is a screen indicating that a drag operation is performed on the help screen.

The recognition part 503 determines whether or not a drag operation is performed (step S4). FIG. 9 is a screen showing that no drag operation is performed on the help screen 15. The drag operation is a gesture to move the finger F in a direction D1 (one direction) along which characters are aligned from the start point, and to stop a movement of the finger F with the finger F being contacted with the touch panel part 503.

If the recognition part 503 determines that no drag operation is performed (No in step S4), the process of step S4 will be repeated.

Otherwise, if the recognition part 503 determines that a drag operation is performed (Yes in step S4), the recognition part 503 stores positional information of an end point on the touch panel part 405 taking a position at which a movement of the finger F is at a stop as the end point (step S5).

When a drag operation is performed, the process proceeds to step S6. The drag operation is an example of the first operation. Here, a position at which a user firstly brings the finger F into contact with the touch panel part 405 is taken as the start point. A user moves the finger F from the start point in one direction with the finger being contacted with the touch panel part 405. Then, a position at which a user stops moving the finger F is taken as the end point.

The recognition part 503 performs recognition processing to a sequence of plural characters (hereinbelow, referred to as a character string) traced by a drag operation out of the character group 17 (step S6). For example, a position indicating a first character of "reduction/enlargement" is taken as the start point. Meanwhile, a position indicating a last character of "reduction/enlargement" is taken as the end point. Then, an assumption is made here that the character string of "reduction/enlargement" is traced with the finger F, and a movement of the finger F is stopped at the end point. The recognition part 503 recognizes the character string lying within the range of the start point and the end point using the screen data, the positional information of the stating point, and the end point on the help screen 15.

The first determination part 507 previously stores a list of the terms contained in the character group 17. The first determination part 507 determines whether or not the character string recognized in step S6 contains a term (step S7).

If the first determination part 507 determines that the character string contains no term (No in step S7), the display control part 501 causes the display part 403 to display a screen indicating that no screen is found associated with a dragged term. The process of the display control part 501 returns back to step S2.

Otherwise, if the first determination part 507 determines that the character string contains a term (Yes in step S7), the first determination part 507 determines whether or not the character string contains two or more terms (step S8).

Figure 10:
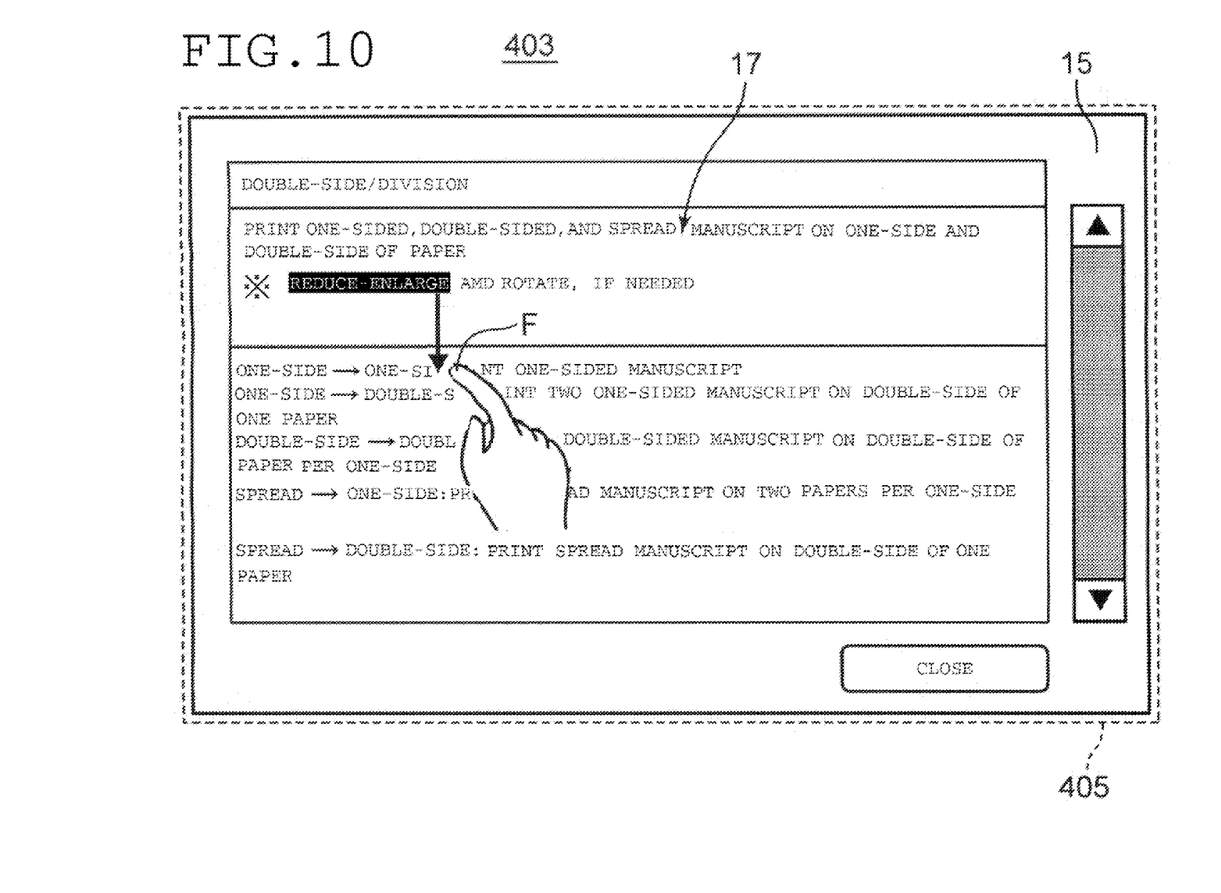
FIG. 10 is a screen indicating that a downward flick operation is performed on the help screen.

If the first determination part 507 determines that the character string does not contain two or more terms, i.e., that the character string contains one term (No in step S8), the second determination part 509 determines, as shown in FIG. 10, whether or not a downward flick operation is performed on the help screen 15 with the finger F being contacted with the end point (step S9).

If the second determination part 509 determines that a downward flick operation is performed (Yes in step S9), the second determination part 509 refers to a list shown in FIG. 4. Then, the second determination part 509 sends information indicating a help screen (here, a help screen 11) to be displayed when the downward flick operation is performed to the display control part 501. The display control part 501 reads out image data indicated by the information from the screen data memory part 505 on the help screen. Then, the display control part 501 switches a screen to be displayed on the display part 403 from the help screen 15 to the help screen 11 shown in FIG. 2 (step S10).

Figure 11:
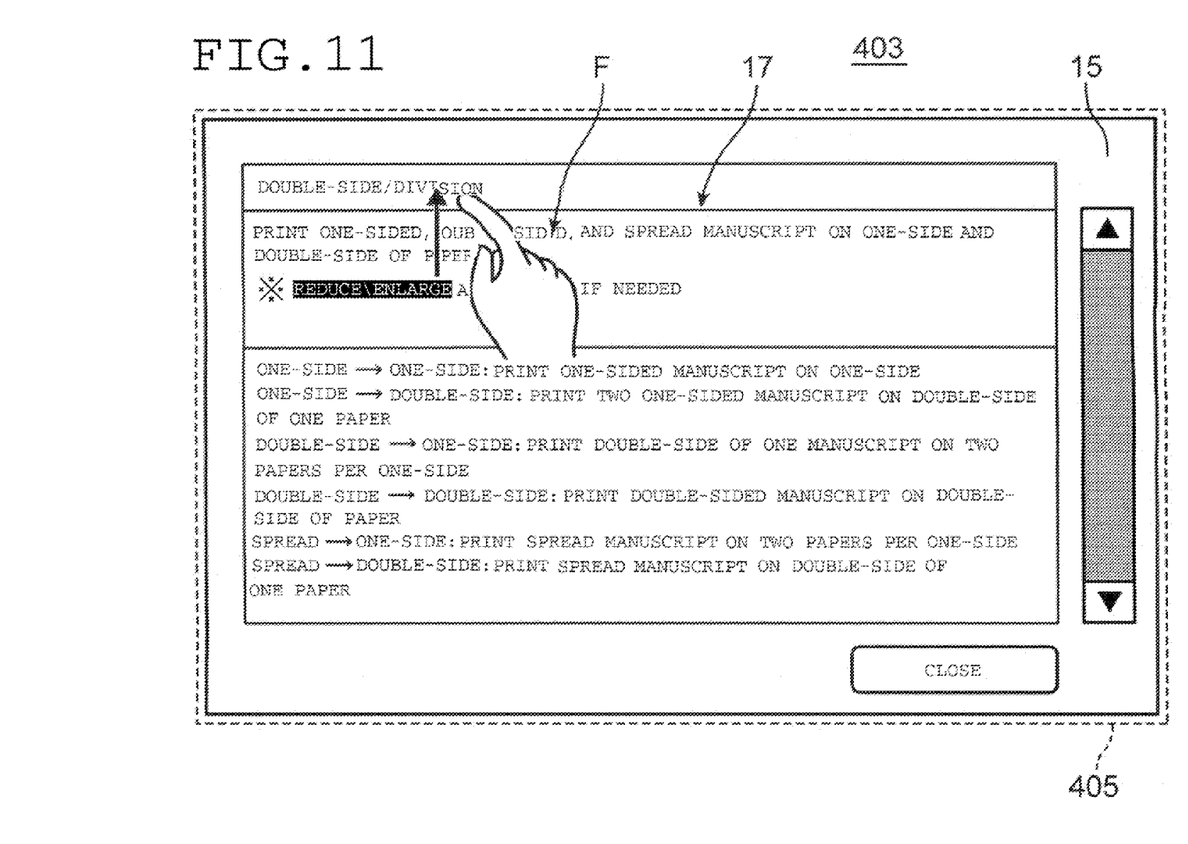
FIG. 11 is a screen indicating that an upward flick operation is performed on the help screen.

Otherwise, if the second determination part 509 determines that no downward flick operation is performed (No in step S9), the second determination part 509 determines, as shown in FIG. 11, whether or not an upward flick operation is performed on the help screen 15 with the finger F being contacted with the end point (step S11).

If the second determination part 509 determines that an upward flick operation is performed (Yes in step S11), the second determination part 509 refers to a list shown in FIG. 4, and then sends information indicating a help screen to be displayed when the upward flick operation is performed to the display control part 501. Here, the help screen is the help screen 13. The display control part 501 reads out image data of the help screen indicated by the information from the screen data memory part 505. Then, the display control part 501 switches a screen to be displayed on the display part 403 from the help screen 15 to the help screen 13 shown in FIG. 3 (step S12).

Thus, if the first determination part 507 determines that the character string dragged in step S4 matches with any of the plural terms (Yes in step S7), and the second determination part 509 determines that a second operation is performed (Yes in step S9, Yes in step 11), the display control part 501 causes the display part 403 to display a predefined screen (help screen) correlated with terms matched with the character string out of the plural terms.

Otherwise, if the second determination part 509 determines that no upward flick operation is performed (No in step S11), then the second determination part 509 determines whether or not the finger F is lifted off the touch panel part 405 (step S13).

If the second determination part 509 determines that the finger F is not lifted off the touch panel part 405 (No in step S13), the process returns back to step S9.

Otherwise, if the second determination part 509 determines that the finger F is lifted off the touch panel part 405 (Yes in step S13), the process returns back to step S2.

Figure 12:
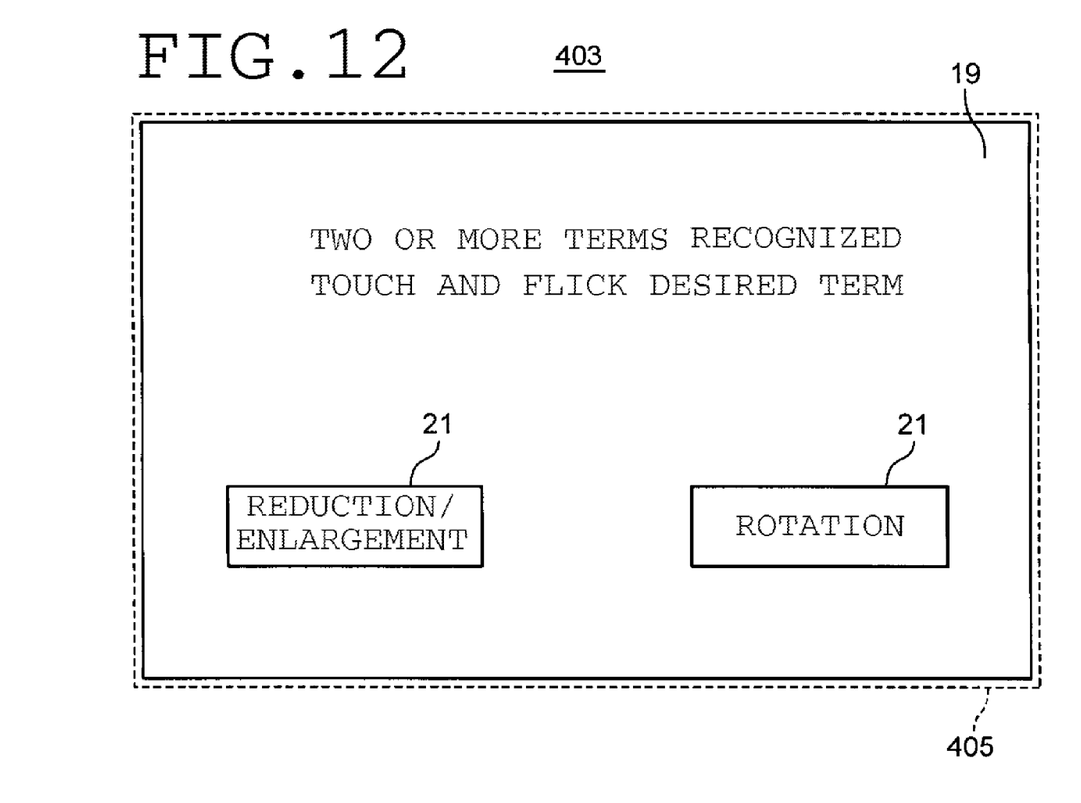
FIG. 12 is a screen indicating a selection screen.

If the first determination part 507 determines that the character string (a sequence of plural characters traced by a drag operation) contains two or more terms (Yes in step S8), the display control part 501 switches a screen to be displayed on the display part 403 from the help screen 15 to an selection screen 19 shown in FIG. 12 (step S14). The selection screen 19 is a screen prompting a user to select any of the two or more terms. The selection screen 19 includes a character image 21 of each of the two or more terms identified by the first determination part 507 in step S8. Here, a description will be made by giving an example where the selection screen 19 includes a character image 21 indicating "reduction/enlargement" and a character image 21 indicating "rotation".

The second determination part 509 determines whether or a user performs a downward flick operation on either of the character images 21 (step S15).

If the second determination part 509 determines that a user performs a downward flick operation on either of the character images 21 (Yes in step S15), the display control part 501 causes the display part 403 to display a help screen explaining a function indicated by the character images 21 (step S16).

Otherwise, if the second determination part 509 determines that a user performs no downward flick operation on either of the character images 21 (No in step S15), the second determination part 509 determines whether or not a user performs an upward flick operation on either of the character images 21 (step S17).

If the second determination part 509 determines that the upward flick operation is performed (Yes in step S17), the display control part 501 causes the display part 403 to display a screen explaining a combined function including a function indicated by the character images 21 (step S18).

For example, if the character image 21 indicating "reduction/enlargement" is flicked downwardly, the display control part 501 causes the display part 403 to display the help screen 11 shown in FIG. 2. If the character image 21 indicating "reduction/enlargement" is flicked upwardly, the display control part 501 causes the display part 403 to display the help screen 13 shown in FIG. 3.

Otherwise, if the second determination part 509 determines that no upward flick operation is performed (No in step S17), the process returns back to step S15.

Main effects or advantages of the present embodiment will be described. According to the present embodiment, the embodiment identifies a term on which a user focused his/her attention out of the character group 17 included in the screen (step S6, Yes in step S7) based on a drag operation that is the first operation (Yes in step S4), and causes the display part 403 to display a screen correlated with the identified term (step S10, Yes in step S12) based on a flick operation that is the second operation (Yes in step S9, Yes in step S11). Thus, the embodiment allows a smooth display of a screen associated with a term on which the user focused his/her attention out of the character group 17 included in the screen displayed on the display part 403.

Even when the first operation is a drag operation and the second operation is a flick operation, it is likely that the second determination part 509 cannot distinguish between the drag operation and the flick operation as far as a finger moves in the same direction in both the drag operation and the flick operation. The drag operation is an action of tracing a sequence of plural characters. Meanwhile, the flick operation is an action of flicking the touch panel part 405. According to the present exemplary embodiment, the second determination part 509 determines whether or not a second operation flicking the touch panel part 405 with a finger is performed in a direction different from one direction with a user's finger being contacted with the end point (step S9, step S11). The one direction of this case is a direction D1 along which the characters are aligned as shown in FIG. 9. In this way, since a direction along which a finger moves is differentiated between the drag operation (first operation) and the flick operation (second operation), a secure distinction can be achieved between the drag operation and the flick operation.

Further, according to the present embodiment, if a downward flick operation is performed (Yes in step S9), the display control part 501 causes the display part 403 to display the help screen 11 corresponding to the downward flick operation (step S10), and if an upward flick operation is performed, the display control part 501 causes the display part 403 to display the help screen 13 corresponding to the upward flick operation (step S12). In this way, in a case where there are two screens correlated with a term, either of the two screens can be selected for display. Further, a direction along which the finger F moves is opposed between the first direction (downward direction) and the second direction (upward direction). This allows a secure distinction between the first direction and the second direction.

It is to be noted that a direction of the flick operation is not always limited to two. For example, a rightward flick operation and a leftward flick operation may be further added to the downward flick operation and the upward flick operation. On this occasion, the display control part 501 may cause the display part 403 to display a screen to be displayed when a flick operation is performed in that direction depending on a direction of flick operations.

Moreover, according to the present embodiment, if the character string contains two or more terms (Yes in step S8), the display control part 501 causes the display part 403 to display the selection screen 19 prompting a user to select any of the two or more terms (step S14). Then, the display control part 509 causes the display part 403 to display a help screen correlated with a selected term (step S16, step S18) if the second determination part 509 determines that a user contacts a finger with the touch panel 405 to select any of the two or more terms, and flicks (second operation) the touch panel 405 (Yes in step S15, Yes in step S17 with the selection screen 19 being displayed on the display part 403. The help screen is a predefined screen. This saves labor for performing over again a drag operation (first operation) in a case where the character string recognized by the recognition part 503 contains two or more terms.

What is claimed is:
1. An image forming apparatus comprising:
a display part;
a touch panel part that is arranged on the display part;
a display control part that causes the display part to display a screen including a character group associated with an operation of the image forming apparatus;
a recognition part that recognizes a sequence of plural characters when a user performs a first operation tracing the plural characters out of the character group included in the screen displayed on the display part by bringing an indicator into contact with the touch panel part;

a first determination part that determines whether or not the plural characters recognized by the recognition part match with any of predetermined plural terms; and a second determination part that determines whether or not the user performs a second operation that is a gesture different from the first operation by bringing the indicator into contact with the touch panel after the first operation is performed, wherein the display control part causes the display part to display a predefined screen correlated with terms matched with the plural characters out of the plural terms when the first determination part determines that the plural characters match with any of the plural terms, and when the second determination part determines that the second operation is performed.

2. The image forming apparatus according to claim 1, wherein the recognition part recognizes the plural characters lying within the range of a start point and an end point when the user performs the first operation in which a position on the touch panel part with which the indicator is firstly brought into contact is taken as the start point, and a position on the touch panel to which the indicator is moved in one direction from the start point with the indicator being contacted with the touch panel and at which a movement of the indicator is stopped taken as the end point, and wherein the second determination part determines whether or not the user performs the second operation flicking the touch panel part by the indicator in a direction different from the one direction with the indicator being contacted with the end point.

3. The image forming apparatus according to claim 2, wherein when the second determination part determines that the user flicks the touch panel part by the indicator in a first direction in the second operation, the display control part causes the display part to display a first screen, as a predefined screen, assigned when the touch panel is flicked in the first direction, and when the second determination part determines that the user flicks the touch panel part by the indicator in a second direction opposite to the first direction in the second operation, the display control part causes the display part to display a second screen, as a predefined screen, different from the first screen assigned when the touch panel is flicked in the second direction.

4. The image forming apparatus according to claim 1, wherein when the recognition part determines that the plural characters contain tow or more terms, the display control part causes the display part to display a selection screen prompting the user to select any of the two or more terms, and wherein when the second determination part determines that the user brings the indicator into contact with the touch panel to select any of the two or more terms, and performs the second operation with the selection screen being displayed on the display part, the display control part causes the display part to display the predefined screen correlated with a selected term.

5. A screen operation method, comprising the steps of:
a first display step that causes a display part on which a touch panel part is arranged to display a screen including a character group associated with an operation of an image forming apparatus;

a recognition step that recognizes a sequence of plural characters when a user performs a first operation tracing the plural characters out of the character group included in the screen displayed on the display part by bringing an indicator into contact with the touch panel part;

a first determination step that determines whether or not the plural characters recognized in the recognition step match with any of predetermined plural terms;

a second determination step that determines whether or not the user performs a second operation that is a gesture different from the first operation by bringing the indicator into contact with the touch panel part after the first operation is performed; and a second display step that causes the display part to display a predefined screen correlated with terms matched with the plural characters out of the plural terms when the first determination step determines that the plural characters match with any of the plural terms, and when the second determination step determines that the second operation is performed.

* * * * *